Nov. 5, 1929.                J. L. BLALACK                1,734,072
                                TOWLINE
                          Filed Sept. 6, 1927
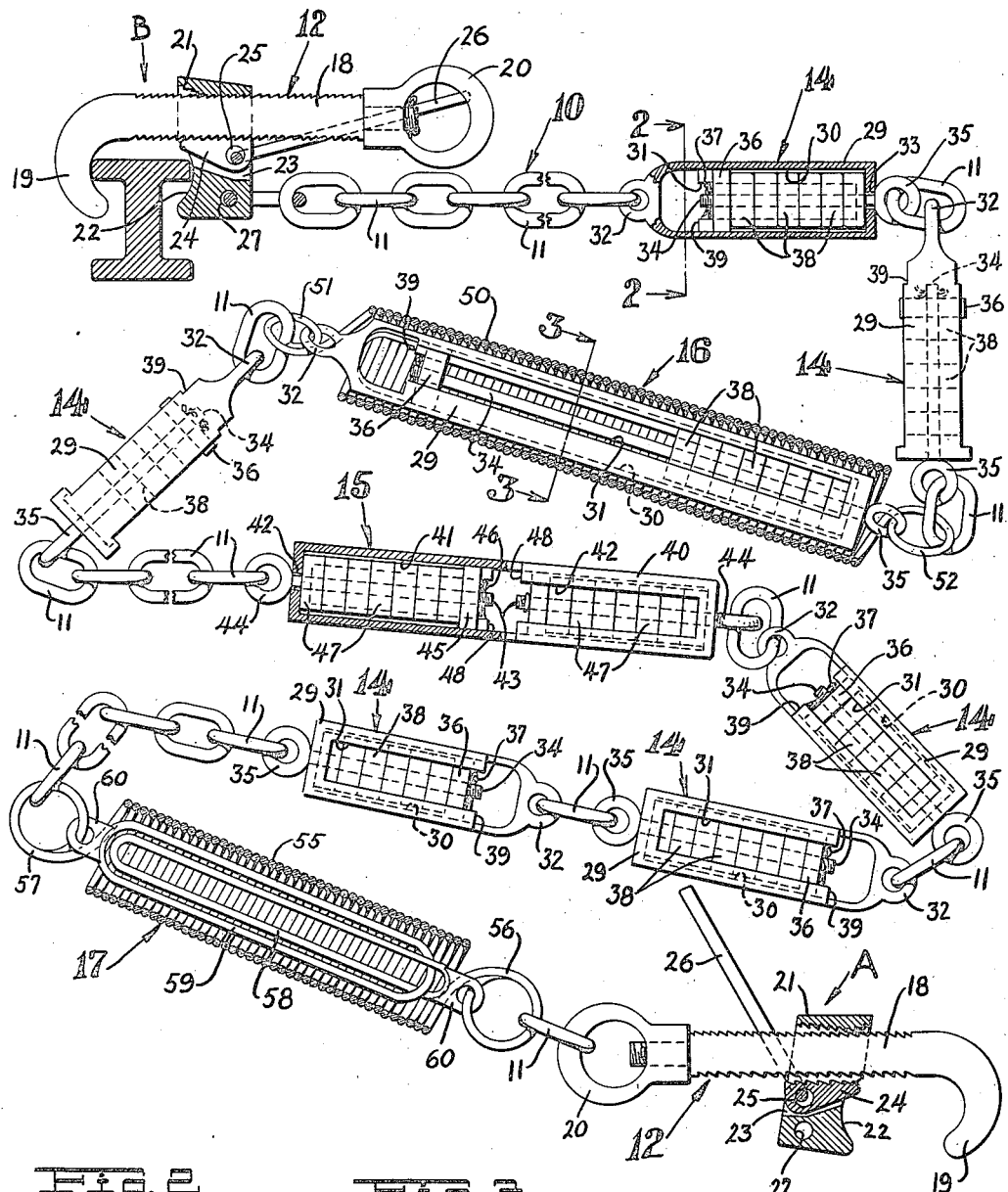
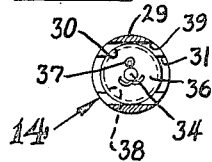
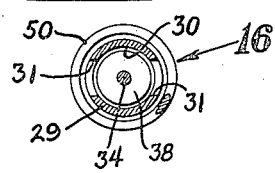
INVENTOR.
J. L. BLALACK
BY
ATTORNEY.

Patented Nov. 5, 1929

1,734,072

UNITED STATES PATENT OFFICE

JACOB L. BLALACK, OF LOS ANGELES, CALIFORNIA

TOWLINE

Application filed September 6, 1927. Serial No. 217,548.

This invention relates to improvements in tow lines.

The general object of this invention is to provide an improved tow line wherein means is provided for absorbing shocks.

Another object of the invention is to provide an improved shock absorbing link for a tow line wherein the shock absorbing means includes a plurality of solid compressible units.

A further object of the invention is to provide a coiled spring shock absorbing link wherein means is provided for limiting the stretch of the spring.

Another object of this invention is to provide a coiled spring shock absorbing link having means to limit the stretch of the spring and wherein the means includes a plurality of solid compressible units.

A still further object of this invention is to provide an improved attaching hook for use with a tow line.

Other objects and the advantages of this invention will be apparent from the following description taken in connection with the accompanying drawing wherein:

Fig. 1 is a view of my improved tow line.

Fig. 2 is a section taken on line 2—2 of Fig. 1 and

Fig. 3 is a section taken on line 3—3 of Fig. 1.

Referring to the drawing by reference characters I have indicated my improved tow line generally at 10. As shown this tow line 10 includes a plurality of chain links 11 connecting a pair of my improved hooks which I have indicated generally at 12. Interposed between some of the chain links 11 I have shown a plurality of shock absorbing links 14, 15, 16 and 17.

My improved attaching hooks 12 include a ratchet toothed shank 18 having a hooked end 19 and having an eye 20 detachably secured to the opposite end. A movable member 21 is positioned on the shank 18, the body of which is curved as at 22 to form a recess and provided with an aperture 23 for the passage therethrough of the shank 18. The upper surface of the aperture is provided with teeth which match the teeth of the shank. The member 21 also includes a gripping member 24 positioned in the aperture 23 and provided with teeth to match the teeth on the shank and which is eccentrically mounted as at 25 upon a lever 26 mounted on the member 21.

When the lever 26 is in the position as shown at A in Fig. 1, the member 24 is free for movement along the shank. When the hook 12 has been positioned upon an object as shown at B in Fig. 1, the lever 26 is moved and the eccentric 25 causes the member 24 to grip the shank 18 and thus hold the member 21 immovable. The member 21 is also provided with an aperture 27 by which the tow line may be attached to the hook as shown. If desired the tow line may be attached to the eye 20 as shown.

The shock absorbing links 14 are all alike and a single one of the links includes a body portion 29 having a longitudinal circular recess 30 therein and having a slot 31 in each side. Both ends of the body 29 are closed and one end has an eye 32 formed integral therewith, while the opposite end is provided with an aperture 33 for the passage therethrough of the shank of a bolt 34. One end of the bolt 34 is provided with an eye 35 while the opposite end is screw threaded for the reception of a nut 36 which may be circular and which when in place is retained thereon by a cotter pin 37 or any other suitable means.

Arranged on the shank of the bolt 34 and interposed between the apertured end of the body 29 and the nut 36 I provide a plurality of rubber washers 38 of such a consistency as to be compressible about half their width when under the full strain for which they are intended. For inserting the nut 36 into the recess 30 I cut away the sides of the body 29 as at 39.

When the shock absorbing links 14 are interposed in the tow chain 10 one of the links 11 is preferably attached to the body eye 32 and another of the chain links is preferably attached to the bolt eye 35. Thus it will be seen that when the chain 10 is subjected to a sudden pull the rubber washers 38 will be compressed between the apertured end of the body and the nut 36, thereby absorbing some of the shock imparted to the chain.

A plurality of these shock absorbing links 14 may be spaced at intervals in a tow line or the complete tow line may be made up of the links 14 connected together by a single chain link 11, although preferably I employ the completed structure as shown.

The shock absorbing link 15 merely comprises two of the links 14 and includes a tubular body portion 40 having a cylindrical recess 41 with a slot 42 in each side. Both ends of the body 40 are closed and provided with apertures 42 for the passage therethrough of the shanks of bolts 43. These bolts 43 are similar to the bolts 34 and are each provided at one end with an eye 44 while the opposite end is screw threaded for the reception of a circular nut 45 which when in place is retained thereon by a cotter pin 46.

Arranged on the shanks of the bolts 43 and interposed between the ends of the body 40 and the nuts 45 I provide a plurality of resilient rubber washers 47 which are preferably compressible similar to the washers 38 of the links 14. For inserting the nuts 45 I may cut away the sides of the body portion 40 as at 48.

When these shock absorbing links 15 are interposed in a tow chain the chain links 11 are attached to each of the bolt eyes 44 as shown. A plurality of these shock absorbing links 15 may be interposed in a tow line or they may preferably be used in combination with the shock absorbing links 14 as shown in the drawing. When a sudden pull or jerk is imparted to the tow line in which the links 15 are incorporated they will function to absorb the shock in the same manner as previously described in connection with the shock absorbing links 14.

The shock absorbing link 16 is merely an elongated link 14 with a coiled spring 50 arranged around it. The parts of this link are designated by reference numerals which are the same as those used in describing the link 14 since the same elements are employed. In addition, in this link 16 the body eyes 32 is attached to a loop 51 formed at one end of the spring 50 and the bolt eye 35 is attached to a loop 52 formed at the other end of the spring 50.

When the shock absorbing links 16 are interposed in a tow line the chain links 11 are attached to the spring loops 51 and 52. The principal difference between the construction of this shock absorbing link 16 and the shock absorbing link 14 is that the resilient rubber washers 38 extend over a relatively small space between the apertured end of the body and the nut 36, thus allowing the spring 50 to stretch and absorb the shock before the nut 36 contacts with the washers 38. When the nut 36 contacts with the washers 38 the washers compress and prevent an additional shock from becoming imparted to the tow line which would be the case if no means were provided for cushioning the stopping of the bolt 34 and nut 36.

The shock absorbing link 17 comprises a coiled spring link having means for limiting the stretch of the spring, but it has no means provided for cushioning the stopping of the stretch limiting means.

This shock absorbing link 17 includes a coiled spring 55 having a loop 56 formed at one end and a loop 57 formed at the opposite end. Arranged inside of the coiled spring 55 I provide a pair of elongated eyes 58 and 59 linked together. These elongated eyes 58 and 59 are each provided at opposite ends with an apertured lip 60. The lip 60 of the eye 58 is shown as attached to the spring end loop 56 and the lip 60 of the eye 59 is shown as attached to the spring end loop 57.

When this shock absorbing link 17 is interposed in the tow chain 10 a chain link 11 is attached to the spring loop 56 and another chain link 11 is attached to the spring loop 57. Thus it will be seen that when a sudden pull or jerk is imparted to the tow chain 10 the coiled spring 55 will stretch and absorb some of the shock and when the spring 55 is stretched to its further safe limit the elongated eye 58 and the elongated eye 59 will abut and prevent the coiled spring from being stretched beyond its safe limit.

As shown in the drawings I prefer to incorporate both of the coiled spring shock absorbing links 16 and 17 in my tow chain 10, as the coiled spring 50 of the link 16 could be made to actuate to take care of the lighter shocks while the coiled spring 55 of the link 17 could be made stiffer and only actuate when an exceedingly hard shock is imparted to the tow line. The links 14 at all times act to cushion the shocks applied to the tow line.

From the foregoing description it will be apparent that I have provided an improved tow line wherein improved means is provided for attaching the tow line to objects and wherein novel means is provided for absorbing any shock which may be imparted to the tow line when in use.

Having thus described my invention, I claim:

1. In combination with a tow line, means for absorbing the shocks in said tow line, said means including an extensible shock absorbing link interposed in said tow line, said shock absorbing link comprising concentric elements having means at each end thereof engaging said line, and resilient means arranged within said link associated with said shock absorbing link to limit the extension thereof when said link is stretched to a predetermined length.

2. A shock absorbing link including a hollow body having a closed end, an aperture in said end, a bolt, the shank of said bolt passing through said aperture, an engaging portion on the outer end of said bolt, a plurality of elongated resilient members arranged on said bolt, means to hold said members on said bolt, a second engaging portion on said body, a coiled spring surrounding said body, loops formed integral with said spring at each end thereof, said second engaging portion being attached to one of said loops, said first engaging portion being attached to the other of said loops, whereupon movement of said coiled spring is limited to a predetermined length.

3. In a tow line, means for absorbing shocks in said tow line, said means including a shock absorbing link interposed in said tow line, said shock absorbing link including a tubular body, the ends of said body being closed, an aperture in one of the ends of said body, a bolt, the shank of said bolt passing through said aperture into said recess, an eye on the outer end of said bolt, screw threads on the opposite end of said bolt and a nut thereon, said nut having a sliding fit in said body, a plurality of resilient washers arranged on said bolt between said nut and the apertured end of said body, said washers partially filling the space between said nut and said apertured ends, means to allow radial expansion of said washers, said means including a longitudinal slot in each side of said body, and an eye formed on said body opposite said apertured end, a coiled spring surrounding said body, loops formed integral with said spring at each end thereof, said body eye being attached to one of said loops, said bolt eye being attached to the other of said loops, whereupon movement of said coiled spring is limited to a predetermined length by the contact of said nut and said washers, a portion of said tow line being attached to each of said spring end loops.

4. For use with a pulling member, an attaching device, said device including a shank having a hook formed at one end, said shank having sets of ratchet teeth thereon, a member movable on said shank, ratchet teeth on said member for engaging one of said sets of teeth on said shank, a clamping dog on said member, ratchet teeth on said clamping dog, said clamping dog being eccentrically mounted upon a shaft whereby in one position of said shaft the ratchet teeth of said dog will engage one set of said shank teeth, causing the teeth of said movable member to engage the other set of said shank teeth and thereby hold said member immovable on said shank, said shaft when in another position causing the teeth on said dog to disengage said teeth on said shank and allowing said member to be moved.

5. In combination with a tow line, means at the end of said tow line for securing it to an object, said means including a shank having a hook formed at one end and having an eye at the opposite end for attachment to said tow line, said shank having two sets of ratchet teeth thereon, a member movable on said shank, ratchet teeth on said member for engaging one of said sets of teeth on said shank, a clamping dog in said member, ratchet teeth on said clamping dog, said clamping dog being eccentrically mounted upon a shaft whereby in one position of said shaft the ratchet teeth of said dog will engage one set of said shank teeth, causing the teeth of said movable member to engage the other set of said shank teeth and thereby hold said member immovable on said shank, said shaft when in another position causing the teeth on said dog to disengage said teeth on said shank and allowing said member to be moved, the face of said member opposite said shank hook being concave to form a gripping portion in conjunction with said shank hook, said tow line being attached to said shank eye.

In testimony whereof, I hereunto affix my signature.

JACOB L. BLALACK.